United States Patent
Ge

(10) Patent No.: US 6,532,073 B2
(45) Date of Patent: Mar. 11, 2003

(54) FRINGE ANALYSIS ERROR DETECTION METHOD AND FRINGE ANALYSIS ERROR CORRECTION METHOD

(75) Inventor: Zongtao Ge, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 28 days.

(21) Appl. No.: 09/944,357

(22) Filed: Sep. 4, 2001

(65) Prior Publication Data

US 2002/0051134 A1 May 2, 2002

(30) Foreign Application Priority Data

Sep. 13, 2000 (JP) .......................................... 2000-277444
Jan. 31, 2001 (JP) .......................................... 2001-022633

(51) Int. Cl.$^7$ ................................................ G01B 9/02
(52) U.S. Cl. ........................................................ 356/512
(58) Field of Search ................................ 356/510, 511, 356/512, 513, 516

(56) References Cited

PUBLICATIONS

Morimoto, Yoshiharu and Motofuni Fujisawa. "Fringe pattern analysis by a phse–shifting method using Fourier transform." Nov. 1994, Optical Engineering, vol. 33 No. 11, p. 3709–3714.*

Dorrio, B.V. et al. "Phase error calculation in a Fizeau interfereometer by Fourier expansion of the intensity profile," Jan. 1, 1996, Applied Optics, vol. 35 No. 1, p. 61–64.*

Mitsuo Takeda, "Subfringe Interferometry Fundamentals", *Kogaku*, Feb. 1984, pp. 55–65, vol. 13, No. 1, Japan.

Katherine Creath, "Phase–Measurement Interferometry Techniques", *Progress in Optics*, E. Wolf, Editor, 1988, pp. 349–393, vol. XXVI, Elsevier Science Publishers B.V., New York, U.S.A.

\* cited by examiner

*Primary Examiner*—Samuel A. Turner
*Assistant Examiner*—Michael A. Lyons
(74) *Attorney, Agent, or Firm*—Snider & Associates; Ronald R. Snider

(57) ABSTRACT

Fringe image data obtained by use of the phase shift method is Fourier-transformed, so as to determine the carrier frequency and the complex amplitude which occur due to the deviation between the respective wavefronts from the object to be observed and a reference. According to the carrier frequency and the complex amplitude, the amount of translational displacement of phase shift and the amount of inclination are detected, so as to correct the results determined by the phase shift method. Thus, the influences of errors in the amount of inclination/amount of displacement in the phase shift element can be eliminated easily.

11 Claims, 9 Drawing Sheets

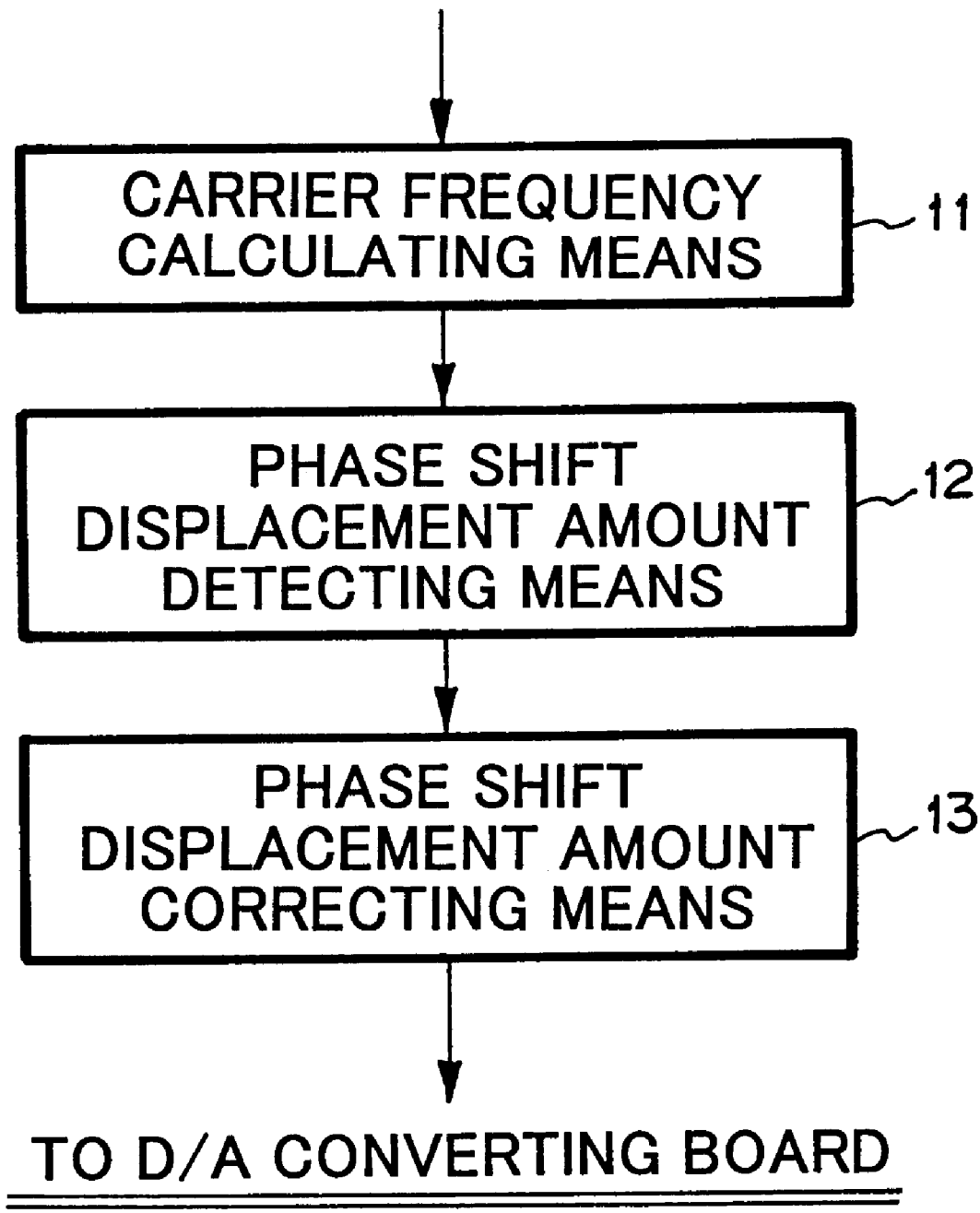

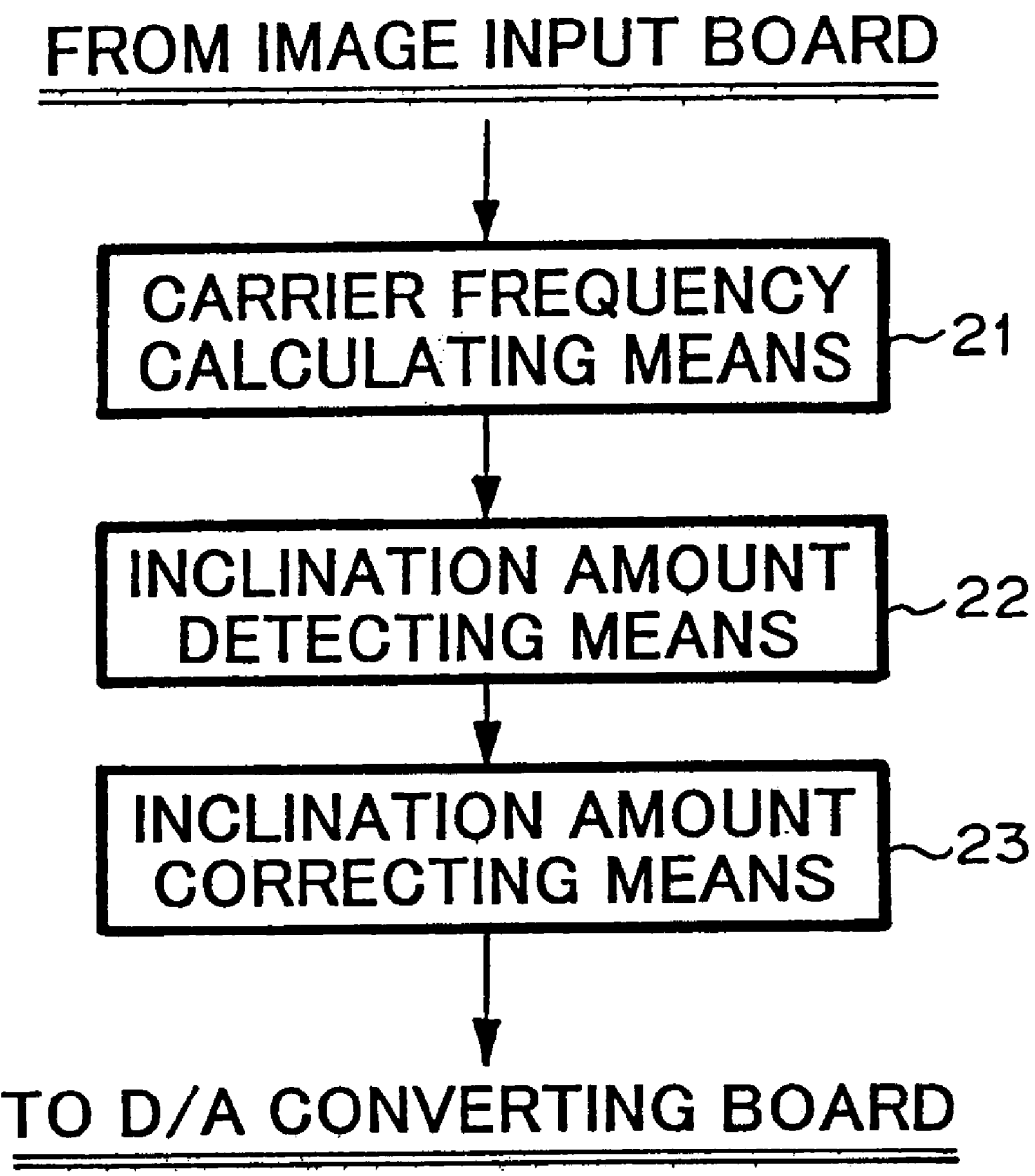

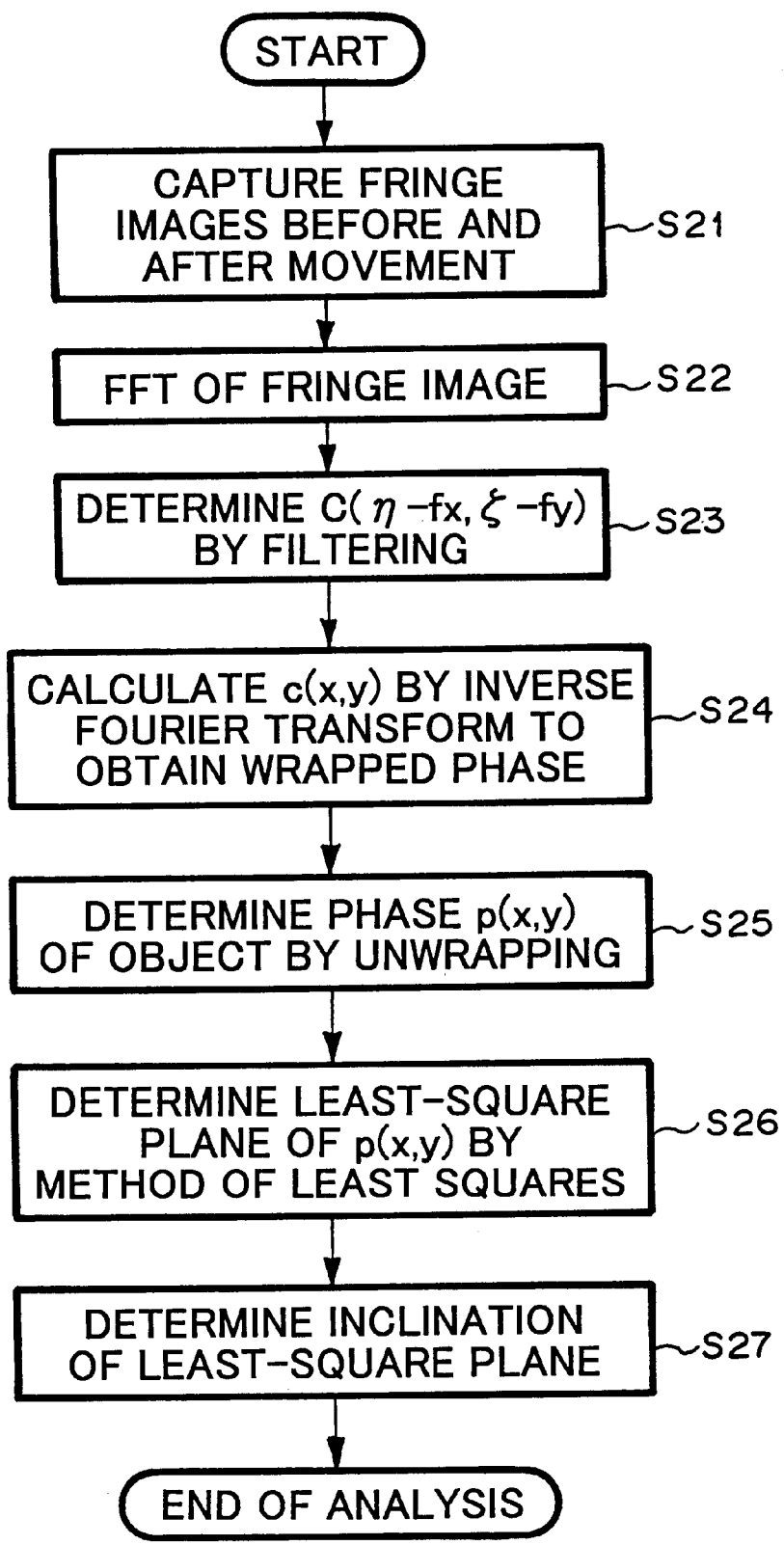

FRINGE ANALYSIS ERROR DETECTION METHOD AND FRINGE ANALYSIS ERROR CORRECTION METHOD

RELATED APPLICATIONS

This application claims the priorities of Japanese Patent Application No. 2000-277444 filed on Sep. 13, 2000 and Japanese Patent Application No. 2001-022633 filed on Jan. 31, 2001, which are incorporated herein by reference.

BACKGROUND OF THE INVENTION

1. Field of the Invention

The present invention relates to a fringe analysis error detection method and fringe analysis error correction method using Fourier transform method when analyzing fringe images by using phase shift methods; and, in particular, to a fringe analysis error detection method and fringe analysis error correction method in which PZTs (piezoelectric elements) are used for shifting the phase, and Fourier transform method is utilized when analyzing thus obtained image data with fringe patterns such as interference fringes, whereby the analyzed value can be made more accurate.

2. Description of the Prior Art

While light wave interferometry, for example, has conventionally been knows as an important technique concerning precise measurement of a wavefront of an object, there have recently been urgently demanded for developing an interferometry technique (sub-fringe interferometry) which can read out information from a fraction of a single interference fringe (one fringe) or less due to the necessity of measuring a surface or wavefront aberration at an accuracy of $1/10$ wavelength or higher.

Known as a typical technique widely used in practice as such a sub-fringe interferometry technique is the phase shift fringe analyzing method (also known as fringe scanning method or phase scanning method) disclosed in "Phase-Measurement Interferometry Techniques," Progress in Optics, Vol. XXVI (1988), pp. 349–393.

In the phase shift method, one or more phase shift element such as PZTs (piezoelectric element), for example, are used for phase-shifting the relative displacement between an object to be observed and the reference, interference fringe images are captured each time when a predetermined phase amount is shifted, the interference fringe intensity at each point on the surface to be inspected is measured, and the phase of each point on the surface is determined by using the result of measurement.

For example, when carrying out a four-step phase shift method, respective interference fringe intensities $I_1, I_2, I_3, I_4$ at the individual phase shift steps are expressed as follows:

$$I_1(x, y) = I_0(x, y)[1 + \gamma(x, y)]\cos[\phi(x, y)] \quad (1)$$

$$I_2(x, y) = I_0(x, y)[1 + \gamma(x, y)]\cos[\phi(x, y) + \pi/2]$$

$$I_3(x, y) = I_0(x, y)[1 + \gamma(x, y)]\cos[\phi(x, y) + \pi]$$

$$I_4(x, y) = I_0(x, y)[1 + \gamma(x, y)]\cos[\phi(x, y) + 3\pi/2]$$

where
x and y are coordinates;
$\phi(x, y)$ is the phase;
$I_0(x, y)$ is the average optical intensity at each point; and
$\gamma(x, y)$ is the modulation of interference fringes.

From these expressions, the phase $\phi(x, y)$ can be determined and expressed as:

$$\phi(x, y) = \tan^{-1}\frac{I_4(x, y) - I_2(x, y)}{I_1(x, y) - I_3(x, y)} \quad (2)$$

Though the phase shift methods enable measurement with a very high accuracy if the predetermined step amount can be shifted correctly, it may be problematic in that errors in measurement occur due to errors in the step amount and in that it is likely to be influenced by the disturbance during measurement since it necessitates a plurality of interference fringe image data items.

For sub-fringe interferometry other than the phase shift method, attention has been paid to techniques using the Fourier transform method as described in "Basics of Sub-fringe Interferometry," Kogaku, Vol. 13, No. 1 (February, 1984), pp. 55 to 65, for example.

The Fourier transform fringe analysis method is a technique in which a carrier frequency (caused by a relative inclination between an object surface to be observed and a reference surface) is introduced, so as to make it possible to determine the phase of the object with a high accuracy from a single fringe image. When the carrier frequency is introduced, without consideration of the initial phase of the object, the interference fringe intensity $i(x, y)$ is represented by the following expression (3):

$$i(x,y)=a(x,y)+b(x,y)\cos[2\pi f_x x+2\pi f_y y+\Phi(x,y)] \quad (3)$$

where
$a(x, y)$ is the background of interference fringes;
$b(x, y)$ is the visibility of fringes;
$\phi(x, y)$ is the phase of the object to be observed; and
$f_x$ and $f_y$ are carrier frequencies in the x and y directions respectively expressed by:

$$f_x = \frac{2 \cdot \tan\theta_x}{\lambda}, f_y = \frac{2 \cdot \tan\theta_y}{\lambda}$$

where $\lambda$ is the wavelength of light, and $\theta_x$ and $\theta_y$ are the respective inclinations of the object in the x and y directions.

The above-mentioned expression (3) can be rewritten as the following expression (4):

$$i(x,y)=a(x,y)+c(x,y)\exp[i(2\pi f_x x+2\pi f_y y)]+c^*(x,y)\exp[i(2\pi f_x x+2\pi f_y y)] \quad (4)$$

where $c(x, y)$ is the complex amplitude of the interference fringes, and $c^*(x, y)$ is the complex conjugate of $c(x, y)$.

Here, $c(x, y)$ is represented as the following expression (5):

$$c(x, y) = \frac{b(x, y)\exp[i\phi(x, y)]}{2} \quad (5)$$

The Fourier transform of expression (4) gives:

$$I(\eta,\zeta)=A(\eta,\zeta)+C(\eta-f_x,\zeta-f_y)+C^*(\eta-f_x,\zeta-f_y) \quad (6)$$

where $A(\eta, \zeta)$ is the Fourier transform of $a(x, y)$, and $C(\eta-f_x, \zeta-f_y)$ and $C^*(\eta-f_x, \zeta-f_y)$ are the Fourier transforms of $c(x, y)$ and $c^*(x, y)$, respectively.

Subsequently, $C(\eta-f_x, \zeta-f_y)$ is taken out by filtering, the peak of the spectrum positioned at coordinates $(f_x, f_y)$ is transferred to the origin of a Fourier frequency coordinate system (also referred to as Fourier spectra plane coordinate system; see FIG. 6), and the carrier frequencies are eliminated. Then, inverse Fourier transform is carried out, so as to determine c(x, y), and the wrapped measured phase φ(x, y) can be obtained by the following expression (7):

$$\phi(x, y) = \tan^{-1} \frac{\text{Im}[c(x, y)]}{\text{Re}[c(x, y)]} \quad (7)$$

where Im[c(x, y)] is the imaginary part of c(x, y), whereas Re[c(x, y)] is the real part of c(x, y).

Finally, unwrapping processing is carried out, so as to determine the phase Φ(x, y) of the object to be measured.

In the Fourier transform fringe analyzing method explained in the foregoing, the fringe image data modulated by carrier frequencies is subjected to a Fourier transform method as mentioned above.

As mentioned above, the phase shift method captures and analyzes the brightness of images while applying a phase difference between the object light of an interferometer and the reference light by a phase angle obtained when 2π is divided by an integer in general, and thus can theoretically realize highly accurate phase analysis.

For securing highly accurate phase analysis, however, it is necessary to shift the relative displacement between the sample and the reference with a high accuracy by predetermined phase amounts. When carrying out the phase shift method by physically moving the reference surface or the similar by using phase shift elements, e.g., PZTs (piezoelectric elements), it is necessary to control the amount of displacement of PZTs (piezoelectric elements) with a high accuracy. However, errors in displacement of the phase shift elements or errors in inclination of the reference surface or sample surface are hard to eliminate completely. Controlling the amount of phase shift or amount of inclination is actually a difficult operation. Therefore, in order to obtain favorable results, it is important to detect the above-mentioned errors resulting from the phase shift elements, and correct them according to thus detected values when carrying out the fringe analysis.

SUMMARY OF THE INVENTION

In view of the circumstances mentioned above, it is an object of the present invention to provide a fringe analysis error detection method utilizing a Fourier transform fringe analyzing method which can favorably detect, without complicating the apparatus configuration when analyzing fringe image data obtained by use of the phase shift method, influences of errors in the amount of displacement of phase shift and/or in the amount of relative inclination between the object to be observed and the reference.

It is another object of the present invention to provide a fringe analysis error correction method utilizing a Fourier transform fringe analyzing method which can favorably correct, without complicating the apparatus configuration when analyzing fringe image data obtained by use of the phase shift method, influences of errors in the amount of displacement of phase shift and/or in the amount of relative inclination between the object to be observed and the reference.

The present invention provides a fringe analysis error detection method in which phase shift elements are used for relatively phase-shifting an object to be observed and a reference with respect to each other, and a wavefront of the object is determined by fringe analysis;

the method comprising the steps of Fourier-transforming two pieces of carrier fringe image data respectively carrying wavefront information items of the object before and after the phase shift; and carrying out a calculation according to a result of the transform so as to detect an amount of error of the phase shift.

Here, the "amount of error of the phase shift" includes at least "amount of relative inclination between the object to be observed and the reference" and "amount of translational displacement of the phase shift."

In the fringe analysis error detection method in accordance with the present invention, the fringe image data may be carrier fringe image data on which carrier fringes are superposed.

In the fringe analysis error detection method in accordance with the present invention, the two pieces of carrier fringe image data may be Fourier-transformed so as to determine carrier frequencies, and a position of a spectrum may be calculated according to two of the carrier frequencies so as to detect an amount of relative inclination between the object and reference generated by the phase shift.

When determining the carrier frequencies of carrier fringes in this case, a positional coordinate of a predetermined peak among peaks on a frequency coordinate system obtained by the Fourier transform may be determined, and an arithmetic operation for calculating the carrier frequencies may be carried out according to the positional coordinate.

In the fringe analysis error detection method in accordance with the present invention, the two pieces of carrier fringe image data may be Fourier-transformed so as to determine phase information of the object, and thus obtained phase information of the object may be subjected to a predetermined arithmetic operation so as to detect an inclination of the object.

When determining the phase information of the object in this case, a predetermined spectrum distribution among spectrum distributions on a frequency coordinate system obtained by the Fourier transform may be determined, and an arithmetic operation for calculating the phase information according to the spectrum distribution may be carried out.

The predetermined arithmetic operation may be an arithmetic operation for determining a least square of the phase information of the object.

In the fringe analysis error detection method in accordance with the present invention, the two pieces of carrier fringe image data may be Fourier-transformed so as to determine complex amplitudes of carrier fringes, and a position may be calculated according to two of the complex amplitudes so as to detect the amount of translational displacement of the phase shift.

In the fringe analysis error detection method in accordance with the present invention, the two pieces of carrier fringe image data may be Fourier-transformed so as to determine carrier frequencies and complex amplitudes, and a position may be calculated according to two of the carrier frequencies and two of the complex amplitudes so as to detect the amount of relative inclination between the object and reference and the amount of tilt displacement of the phase shift which are generated by the phase shift.

In the fringe analysis error detection method in accordance with the present invention, the fringe images may be an interference fringe images.

Also, the present invention provides a fringe analysis error correction method in which, after the detection is carried out in the fringe analysis error detection method in accordance with the present invention, a correction calculation for compensating for the difference of the detected amount of inclination generated by the phase shift from a target amount of inclination and/or the difference of a predetermined amount of translational displacement of phase shift from a target predetermined amount of displacement of phase shift is carried out in the fringe analysis of the fringe image data.

The above-mentioned methods in accordance with the present invention are applicable to fringe image analyzing techniques using the Fourier transform method in general, such as analysis of interference fringes and moiré fringes, three-dimensional projectors based on fringe projection, or the like, for example.

BRIEF DESCRIPTION OF THE DRAWINGS

FIG. 3 is a block diagram showing a part of FIG. 2 in detail;

FIG. 8 is a block diagram specifically showing a part of FIG. 7; and

FIG. 9 is a flowchart showing a partly modified example of the flowchart shown in FIG. 5.

DESCRIPTION OF THE PREFERRED EMBODIMENTS

In the following, the fringe analysis error detection method and fringe analysis error correction method in accordance with embodiments of the present invention will be explained with reference to the drawings.

These methods are techniques for determining a wavefront of an object to be observed by using the phase shift method, in which fringe image data carrying wavefront information of the object obtained according to a relative form between the object surface and a reference surface is subjected to the Fourier transform method so as to determine carrier frequencies and complex amplitudes occurring due to the deviation between the wavefront from the object and the wavefront from the reference, and the amount of relative inclination between the object surface and reference surface and the amount of displacement of phase shift are detected according to the carrier frequencies and complex amplitudes. Thereafter, a correcting calculation for compensating for the detected amount of inclination and amount of displacement is carried out in the fringe analysis of the fringe image data according to the phase shift method.

In the following, the detection and correction of the amount of displacement of phase shift and the detection and correction of the amount of relative inclination between the object to be observed and the reference in the phase shift will be explained separately from each other.

Detection and Correction of Translational Displacement of Phase Shift

Figure 1:
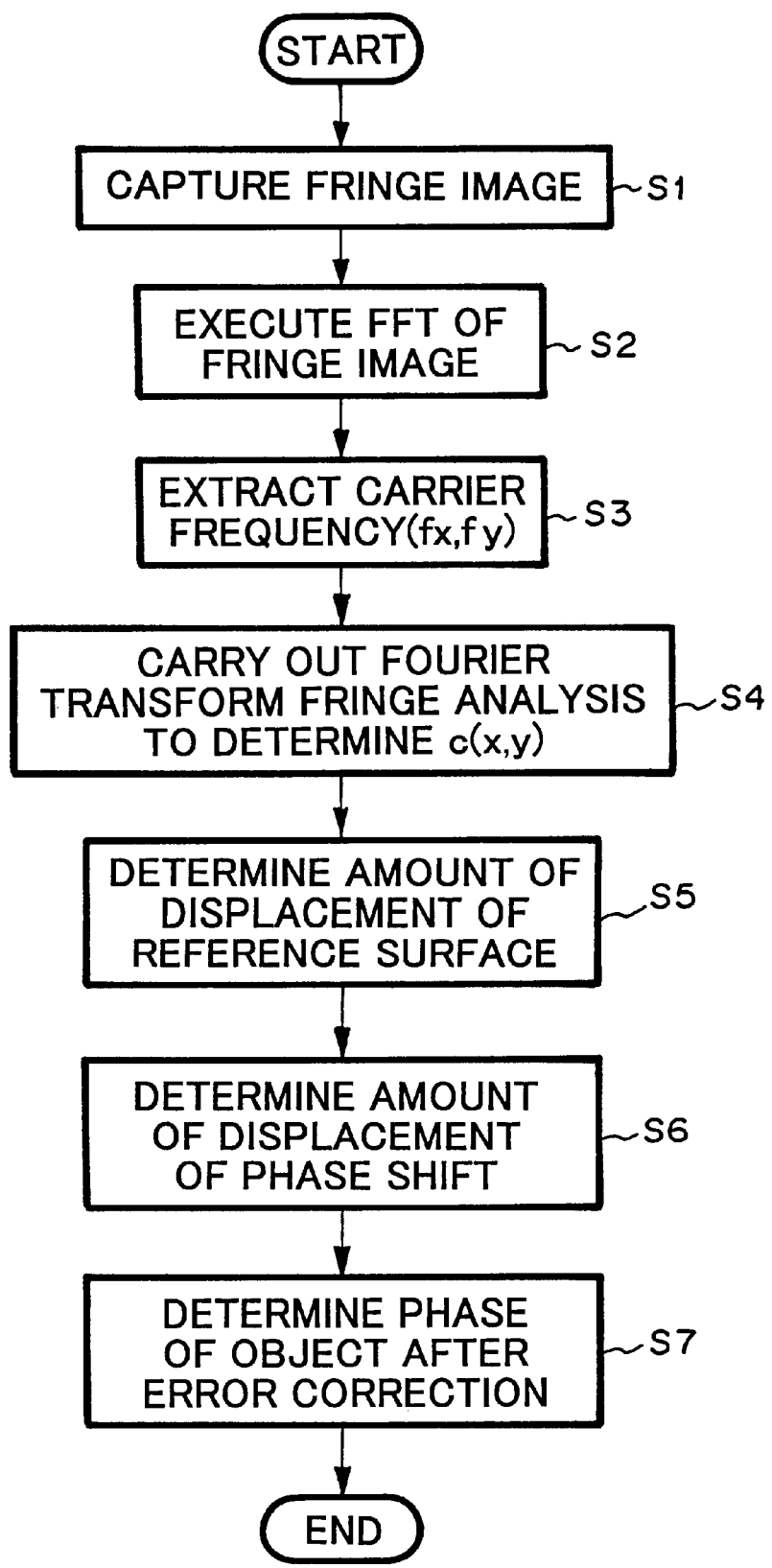
FIG. 1 is a flowchart for explaining the method in accordance with an embodiment of the present invention.

The outline of the phase shift error amount detecting and correction method in accordance with an embodiment will now be explained with reference to the flowchart of FIG. 1.

First, an interference fringe image carrying phase information of an object to be observed, on which spatial carrier fringes are superposed, is obtained by a CCD imaging camera (S1). Subsequently, thus obtained interference fringe image data is subjected to Fourier transform (S2), a spatial carrier frequency ($f_x$, $f_y$) is extracted (S3), and a Fourier transform fringe analysis is carried out according to this carrier frequency, so as to determine a complex amplitude c(x, y) (S4) which will be explained later. Then, the amount of displacement of the reference surface is determined (S5), whereby the amount of displacement of phase shift can be determined (S6). Further, when analyzing the fringe image according to the phase shift amount, the amount of displacement determined at S6 is corrected so as to determine the phase of the object (S7).

In general, the Fourier transform fringe analyzing method can determine the phase with a single fringe image alone by introducing a carrier frequency (relative inclination between the object surface and the reference surface). When the carrier frequency is introduced, the interference fringe intensity is represented by the following expression (8):

$$i(x,y)=a(x,y)+b(x,y)\cos[2\pi f_x x+2\pi f_y y+\phi(x,y)+\xi] \qquad (8)$$

where
a(x, y) is the background of interference fringes;
b(x, y) is the visibility of fringes;
$\phi$(x, y) is the phase of the object to be observed;
$\xi$ is the initial phase ($2\pi x/\lambda$) of the object to be observed; and
$f_x$ and $f_y$ are carrier frequencies.

As mentioned above, $\xi$ can be expressed by $\xi=2\pi x/\lambda$, where $\lambda$ is the wavelength of light, and x is the phase shift amount of the phase shift element, whereby the above-mentioned expression (8) can be modified as the following expression (9):

$$i(x,y)=a(x,y)+c(x,y)\exp[i(2\pi f_x x+2\pi f_y y)]+c^*(x,y)\exp[i(2\pi f_x x+2\pi f_y y)] \qquad (9)$$

where c*(x, y) is the complex conjugate of c(x, y).

Here, c(x, y) is represented by the following expression (10):

$$c(x, y) = \frac{b(x, y)\exp\{i[\phi(x, y) + \xi]\}}{2} \qquad (10)$$

When the above-mentioned expression (9) is Fourier-transformed, the following expression (11) can be obtained:

$$I(\eta,\zeta)=A(\eta,\zeta)+C(\eta-f_x,\zeta-f_y)+C^*(\eta-f_x,\zeta-f_y) \qquad (11)$$

where
A($\eta$, $\zeta$) is the Fourier transform of a(x, y);
C($\eta-f_x$, $\zeta-f_y$) is the Fourier transform of c(x, y); and
C*($\eta-f_x$, $\zeta-f_y$) is the Fourier transform of c*(x, y).

In general, in the Fourier transform method, C($\eta-f_x$, $\zeta-f_y$) is determined by filtering and then is subjected to inverse Fourier transform, so as to yield c(x, y). Here, from the interference fringe image data at the start position, the following expression (12) is obtained:

$$c_0(x, y) = \frac{b(x, y)\exp\{i[\phi(x, y) + \xi_0]\}}{2} \qquad (12)$$

where $\xi_0$ is the initial phase of phase shift, and $\xi_1$ is the phase after the object to be observed is moved.

Subsequently, from the interference fringe data after the object to be observed is moved, the following expression (13) is obtained:

$$c_1(x, y) = \frac{b(x, y)\exp\{i[\phi(x, y) + \xi_1]\}}{2} \quad (13)$$

As a consequence, the following expression (14) is obtained:

$$\frac{c_1(x, y)}{c_0(x, y)} = \frac{\exp\{i[\phi(x, y) + \xi_1]\}}{\exp\{i[\phi(x, y) + \xi_0]\}} = \exp[i(\xi_1 - \xi_0)] \quad (14)$$

Therefore, the phase difference between before and after moving the object to be observed is represented by the following expression (15):

$$\xi = \xi_1 - \xi_0 \quad (15)$$

$$= \tan^{-1} \frac{IM\left[\frac{c_1(x, y)}{c_0(x, y)}\right]}{RE\left[\frac{c_1(x, y)}{c_0(x, y)}\right]}$$

Hence, the amount of displacement of the object to be observed is represented by the following expression (16):

$$x = x_1 - x_0 \quad (16)$$

$$= \frac{2\pi}{\lambda} \cdot \tan^{-1} \frac{IM\left[\frac{c_1(x, y)}{c_0(x, y)}\right]}{RE\left[\frac{c_1(x, y)}{c_0(x, y)}\right]}$$

When the average of the respective amounts of displacement determined for the individual interference fringe images obtained by a predetermined phase shift is determined, the displacement can be detected with a higher accuracy. When detecting the displacement of the object by the Fourier transform fringe analyzing method, it is not always necessary to use the whole fringe image data, whereas even a part of the fringe image data alone makes it possible to detect the displacement with a sufficiently high accuracy.

A method of correcting thus detected amount of displacement of phase shift will now be explained.

First, the principle of correction will be explained with reference to a general expression of the phase shift method.

In an n-bucket phase shift system which moves the reference surface by using PZTs or the like, the intensity distribution of interference fringes on the object to be observed in which the reference surface is shifted for j times (j=1, 2, ..., n) is represented by the following expression (17):

$$i_j(x,y) = a(x,y) + b(x,y)\cos[2\pi f_x x + 2\pi f_y y + \phi(x,y) + \xi_j] \quad (17)$$

In general, in a highly accurate actuator such as PZT, the j-th phase shift amount $\xi_j$ (j=1, 2, ..., n) is given as represented by the following expression (18):

$$\xi_j = \frac{2\pi(j-1)}{n} \quad (18)$$

where $\xi_j$ is the j-th phase shift amount (j=1, 2, ..., n).

The above-mentioned expression (17) may be expanded, whereby the phase $\phi(x, y)$ to be observed can be determined by utilizing the orthogonality of trigonometric functions.

Thus determined expression (19) is as follows:

$$\phi(x, y) = \arctan\left(\frac{\sum s_j i_j}{\sum c_j i_j}\right) + const \quad (19)$$

where $s_j$ is a constant; and $c_j$ is a constant.

Meanwhile, an actuator with a high accuracy is expensive. If a method for detecting the displacement of the actuator is used, a highly accurate phase shift can be obtained without using the expensive actuator.

Namely, assuming the j-th (j=1, 2, ..., n) phase shift amount to be $\xi_j$ (whose specific value is unknown), the following expression (20) is obtained:

$$\xi_j = (j-1)\cdot a + \delta_j \quad (20)$$

where $\delta_j$ is the phase shift error of the actuator ($\delta_j \ll \pi/2$).

Since $\delta_j$ can be determined by the above-mentioned phase shift error amount detection method, the phase analysis error can be corrected with a high accuracy by using the following expressions (21) and (22):

$$\sin(a + x) = \sin a + \cos a \cdot x - \frac{\sin a}{2!} \cdot x^2 - \frac{\cos a}{3!} \cdot x^3 + \frac{\sin a}{4!} \cdot x^4 + \ldots \quad (21)$$

$$\cos(a + x) = \cos a - \sin a \cdot x - \frac{\cos a}{2!} \cdot x^2 + \frac{\sin a}{3!} \cdot x^3 + \frac{\cos a}{4!} \cdot x^4 + \ldots \quad (22)$$

In the following, a 5-bucket method, which is often used, will be explained by way of example. The 5-bucket method is represented by the following expression (23):

$$\phi(x, y) = \arctan\left[\frac{2(i_1 - i_3)}{2i_2 - (i_0 + i_4)}\right] \quad (23)$$

When $a_j = \pi(^{j-1})/2$ (j=1, 2, ..., 5) is utilized here, the following expression (24) is obtained:

$$\frac{2(i_1 - i_3)}{2i_2 - (i_0 + i_4)} = \frac{2[\cos\phi \cdot (\cos\xi_1 - \cos\xi_3) - \sin\phi \cdot (\sin\xi_1 - \sin\xi_3)]}{\cos\phi \cdot (2\cos\xi_2 - \cos\xi_0 - \cos\xi_4) - \sin\phi \cdot (2\sin\xi_2 - \sin\xi_0 - \sin\xi_4)} \quad (24)$$

$$= \tan\phi + \frac{2\left[\cos\phi \cdot (\varepsilon_1 - \varepsilon_3) + \sin\phi \cdot \left(\frac{\varepsilon_1^2}{2} - \frac{\varepsilon_3^2}{2}\right)\right]}{\cos\phi \cdot (2\varepsilon_2 - \varepsilon_0 - \varepsilon_4) + \sin\phi \cdot \left(\varepsilon_2^2 - \frac{\varepsilon_0^2}{2} - \frac{\varepsilon_4^2}{2}\right)}$$

Since $\epsilon_j^2$ is small in general, expression (24) is represented by the following expression (25):

$$\frac{2(i_1 - i_3)}{2i_2 - (i_0 + i_4)} = \tan\phi + \frac{2(\varepsilon_1 - \varepsilon_3)}{2\varepsilon_2 - \varepsilon_0 - \varepsilon_4} \quad (25)$$

Therefore, the following expression (26) is obtained:

$$\phi(x, y) = \arctan\left[\frac{2(i_1 - i_3)}{2i_2(i_0 + i_4)} - \frac{2(\varepsilon_1 - \varepsilon_3)}{2\varepsilon_2 - \varepsilon_0 - \varepsilon_4}\right] \quad (26)$$

Hence, the phase having corrected the shift error of the actuator can be determined.

An apparatus for carrying out the above-mentioned embodiment of the present invention will now be explained with reference to FIGS. 2 and 3.

This apparatus is used for carrying out the method in accordance with the above-mentioned embodiment. As shown in FIG. 2, in a Michelson type interferometer 1, interference fringes formed by respective reflected luminous fluxes from an object surface 2 to be observed and a reference surface 3 are captured at an imaging surface of a CCD 5 of an imaging camera 4, and are fed into a computer 7 equipped with a CPU and an image processing memory by way of an image input board 6. Thus fed interference fringe image data is subjected to various arithmetic operations, and the results of operations are displayed on a monitor screen 7A. Here, the interference fringe image data output from the imaging camera 4 is temporarily stored into the memory upon an operation of the CPU.

As shown in FIG. 3, the computer 7 comprises, in terms of software, an FFT-operated complex amplitude calculating means 11, a phase shift displacement amount detecting means 12, and a phase shift displacement amount correcting means 13. The FFT-operated complex amplitude calculating means 11 carries out the operation of step 3 (S3) for subjecting the obtained interference fringe image to a Fourier transform method and extracting the FFT-operated complex amplitude as mentioned above. The phase shift displacement amount detecting means 12 carries out the operations corresponding to the above-mentioned step 4 (S4) to the above-mentioned step 6 (S6) according to the FFT-operated complex amplitude calculated in the FFT-operated complex amplitude arithmetic means 11. According to the amount of displacement detected by the phase shift displacement amount detecting means 12, the phase shift displacement amount correcting means 13 compensates for the amount of displacement, and determines the phase of the object having corrected the error (S7).

As a consequence, even in the case where a PZT (piezoelectric element) actuator 10 shifts by a predetermined amount, so that an error occurs in the amount of shift of the PZT (piezoelectric element) actuator 10, it is adjusted such that the finally determined phase of the object is not affected by the error. In FIG. 2, since the surface 2 of the object is fixed, the relative displacement in shift amount between the object surface 2 and the reference surface 3 depends on only the amount of displacement of the shift amount of the reference surface 3 shifted by the PZT (piezoelectric element) actuator 10.

Figure 2:
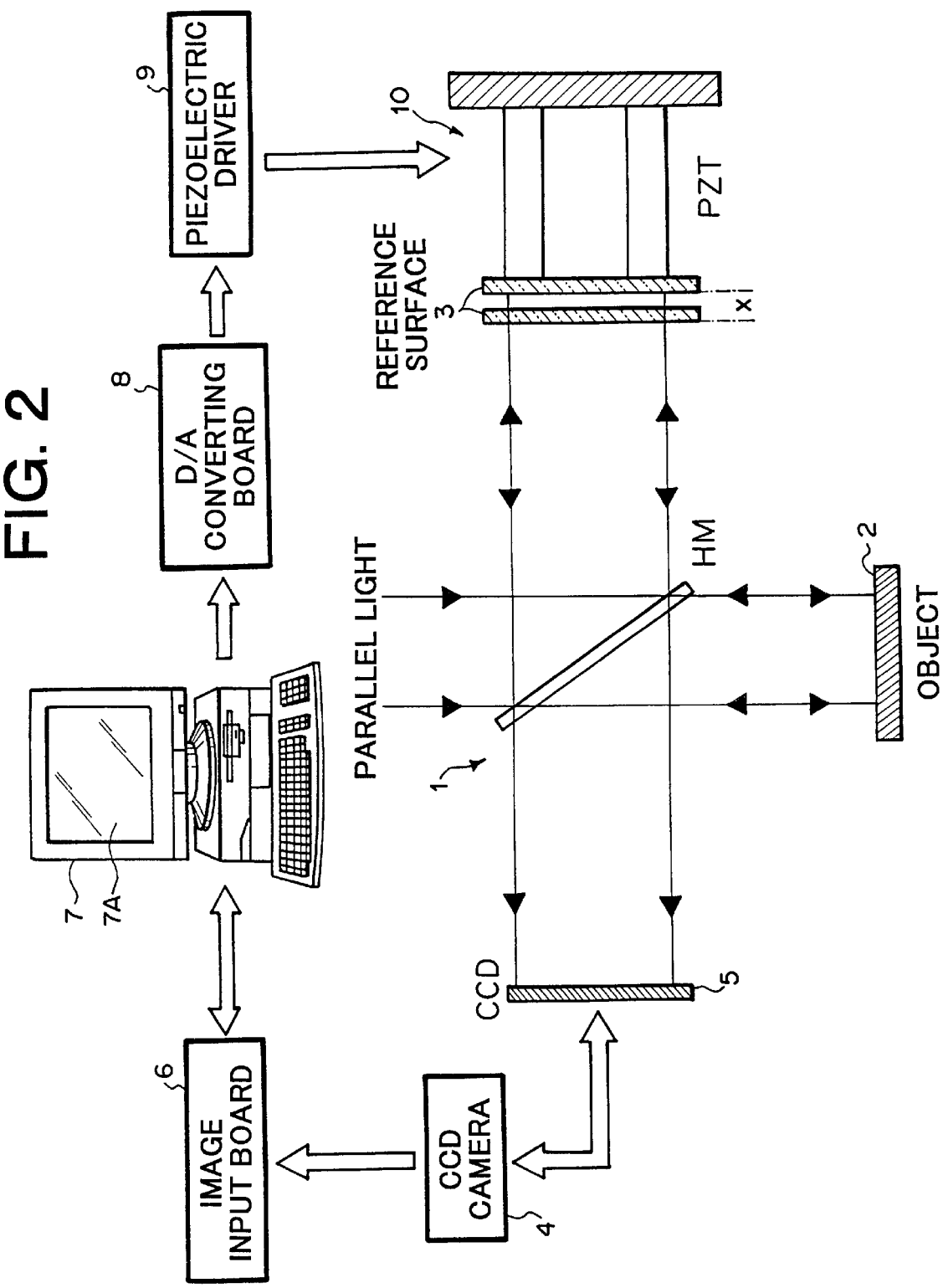
FIG. 2 is a block diagram for realizing the method shown in FIG. 1.

Therefore, the system constructed by the constituents shown in FIGS. 2 and 3 as mentioned above can calculate, according to the determined FFT-operated complex amplitude, the phase of the object in a state where the phase shift displacement amount of the reference surface 3 is eliminated.

Figure 4A:
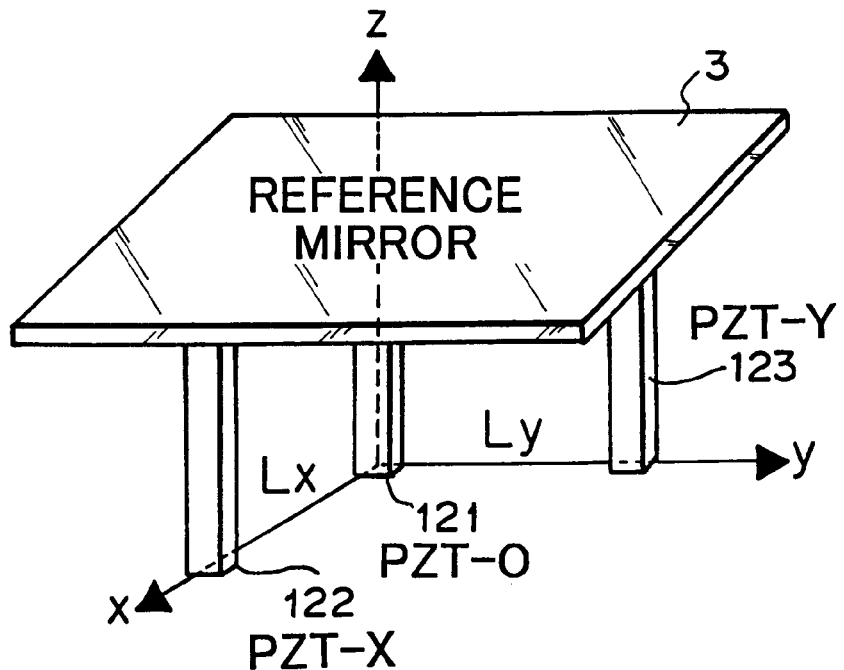
FIGS. 4A and 4B are conceptual views specifically showing a part of FIG. 2.
Figure 4B:
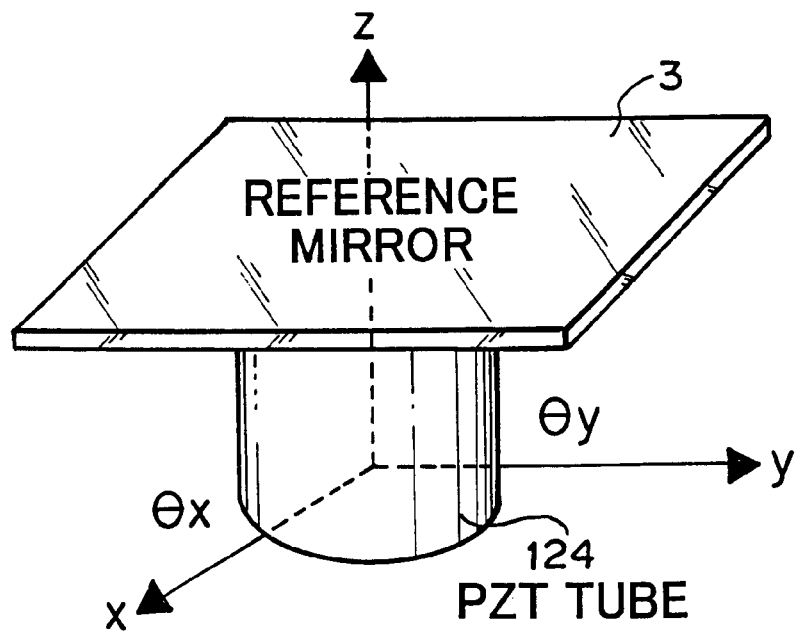

FIGS. 4A and 4B show two modes of the PZT (piezoelectric element) actuator 10, respectively.

As shown in FIG. 4A, the first mode comprises three piezoelectric elements 121, 122, 123 for supporting the reference surface (reference mirror) 3, whereas two lines $L_x$, $L_y$ respectively connecting the piezoelectric element 121, also acting as a fulcrum member, to the other piezoelectric elements 122, 123 on the reference mirror having the reference surface 3 are arranged orthogonal to each other. A phase shift is effected when the three piezoelectric elements 121, 122, 123 expand/contract by the same amount. When the piezoelectric element 122 expands/contracts alone, the reference surface 3 of the reference mirror inclines in the x-axis direction so as to rotate about the y axis. When the piezoelectric element 123 expands/contracts alone, the reference surface 3 of the reference mirror inclines in the y-axis direction so as to rotate about the x axis. As shown in FIG. 4B, the second mode is constructed such that the center part of the back side of the reference surface (reference mirror) 3 is supported by a cylindrical piezoelectric tube 124. A phase shift is effected by an unbiased expansion/contraction of the piezoelectric tube 124. On the other hand, a biased expansion/contraction freely tilts the reference surface 3 of the reference mirror in x- and y-axis directions.

Detection and Correction of Inclination Error in Phase Shift

In general, a plurality of phase shift elements, or a phase shift element and a support guide are necessary in the case where the object to be observed or the reference surface has a large size. In this case, the straightness of phase shift is hard to secure, whereby an inclination may occur in the object or the reference surface. Therefore, in the method in accordance with the embodiment explained in the following, the amount of inclination of the phase shift element (the amount of relative inclination between the object surface and the reference surface) is detected and corrected by a technique substantially similar to the method of the above-mentioned embodiment.

The method in accordance with the second embodiment of the present invention for detecting and correcting the amount of inclination of the phase shift element will now be explained.

Figure 5:
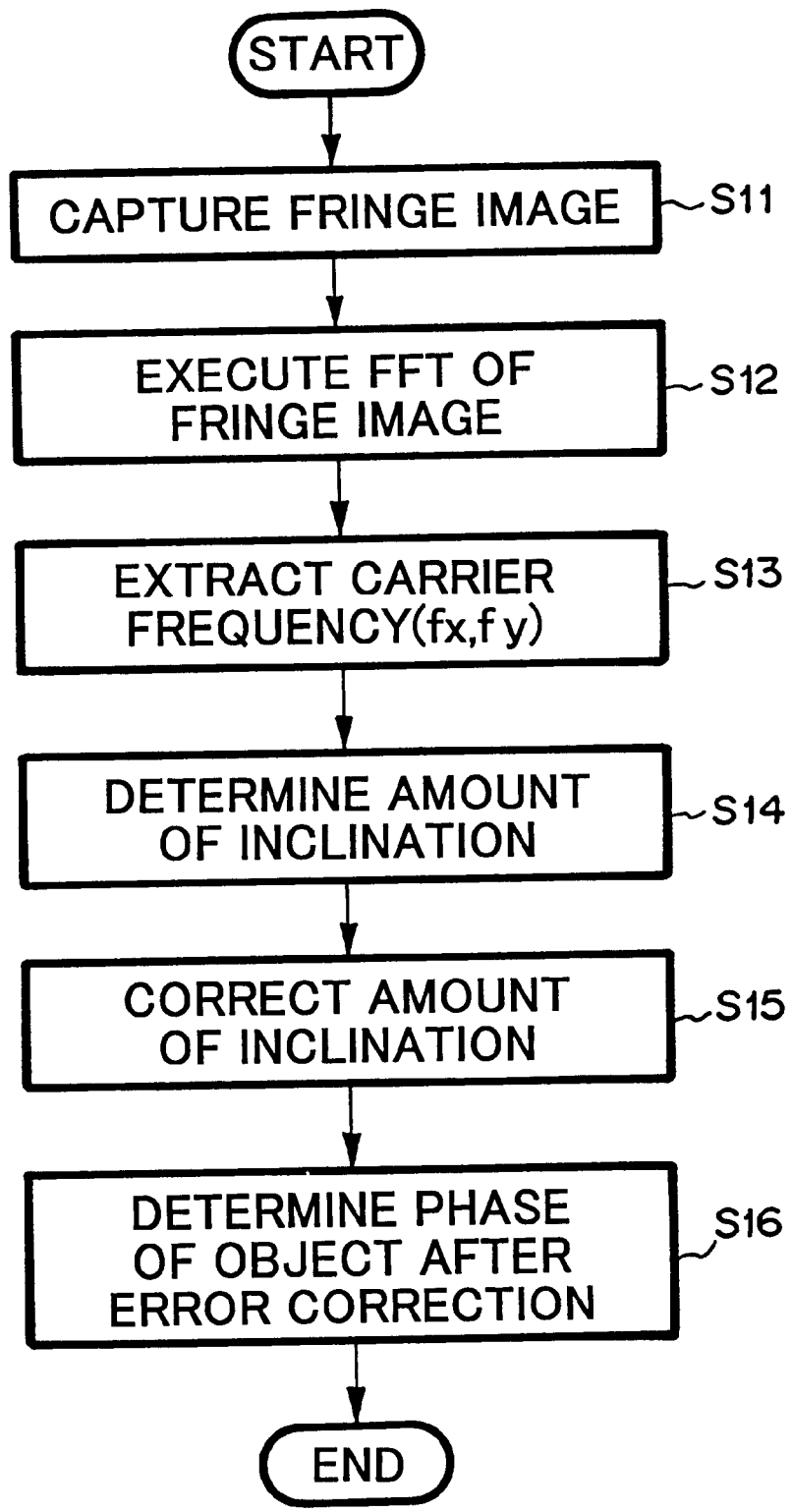
FIG. 5 is a flowchart for explaining the method in accordance with another embodiment of the present invention.

FIG. 5 is a flowchart conceptually showing the method of the second embodiment.

First, an interference fringe image carrying surface form information of an object to be observed, on which spatial carrier fringes are superposed, is obtained by a CCD imaging camera (S11). Subsequently, thus obtained interference fringe image data is subjected to a Fourier transform method (S12), a spatial carrier frequency ($f_x$, $f_y$) is extracted (S13), and a Fourier transform fringe analysis is carried out according to this carrier frequency, so as to determine c(x, y) which will be explained later, whereby the amount of inclination of the reference surface is determined (S14). The amount of inclination is compensated for (S15), and the phase of the object after the correcting calculation is determined (S16).

In the following, the method of the second embodiment will be explained with reference to expressions.

As mentioned above, the Fourier transform fringe analyzing method can determine the phase by a single sheet of fringe image alone by introducing a carrier frequency (relative inclination between the object surface and the reference surface). When the carrier frequency is introduced, the interference fringe intensity is represented by the following expression (27):

$$i(x,y)=a(x,y)+b(x,y)\cos[2\pi f_x x+2\pi f_y y+\phi(x,y)+\xi] \quad (27)$$

where
a(x, y) is the background of interference fringes;
b(x, y) is the visibility of fringes;
$\phi$(x, y) is the phase of the object to be observed;
$\xi$ is the phase shift amount ($2\pi x/\lambda$); and
$f_x$ and $f_y$ are carrier frequencies.
The carrier frequencies $f_x$ and $f_y$ are represented by the following expression (27a):

$$f_x = \frac{2 \cdot \tan\theta_x}{\lambda}, f_y = \frac{2 \cdot \tan\theta_y}{\lambda} \quad (27a)$$

As mentioned above, assuming $\lambda$ to be the wavelength of light, $\theta_x$ and $\theta_y$ to be the respective inclinations (postures) of the object surface in X and Y directions, and x to be the phase shift amount of the phase shift element, the above-mentioned expression (27) can be deformed as the following expression (28):

$$i(x,y)=a(x,y)+c(x,y)exp[i(2\pi f_x x+2\pi f_y y)]+c^*(x,y)exp[i(2\pi f_x x+2\pi f_y y)] \quad (28)$$

where c*(x, y) is the complex conjugate of c(x, y).

Here, c(x, y) is represented by the following expression (29):

$$c(x, y) = \frac{b(x, y) \exp\{i[\phi(x, y) + \xi]\}}{2} \quad (29)$$

When the above-mentioned expression (28) is Fourier-transformed, the following expression (30) can be obtained:

$$I(\eta,\zeta)=A(\eta,\zeta)+C(\eta-f_x,\zeta-f_y)+C^*(\eta-f_x,\zeta-f_y) \quad (30)$$

where
A($\eta$, $\zeta$) is the Fourier transform of a(x, y);
C($\eta-f_x$, $\zeta-f_y$) is the Fourier transform of c(x, y); and
C*($\eta-f_x$, $\zeta-f_y$) is the Fourier transform of c*(x, y).

Figure 6:
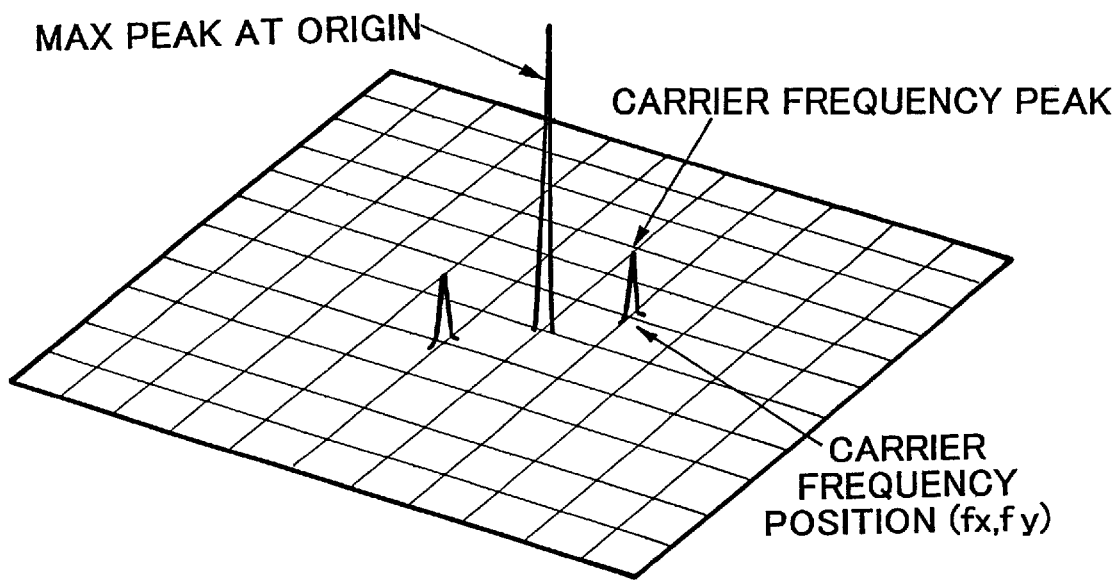
FIG. 6 is a conceptual view for explaining a part of the method shown in FIG. 5.

In the Fourier transform method, in general, C($\eta-f_x$, $\zeta-f_y$) is determined by filtering, the peak of the spectrum located at the position ($f_x$, $f_y$) on a frequency coordinate system is transferred to the origin of coordinates as shown in FIG. 6, so as to eliminate the carrier frequencies. Then, inverse Fourier transform is carried out, so as to determine c(x, y), whereby a wrapped phase is obtained. Subsequently, the phase $\Phi$(x, y) of the object is determined by unwrapping. While ($f_x$, $f_y$) is a carrier frequency, respective values of ($f_x$, $f_y$) are determined in view of the fact that a predetermined angular relationship (relative posture), specifically the relationship of expression (27a), exists between the object surface and the reference surface. According to these values, the angular relationship between the object surface and the reference surface is determined.

The respective values of ($f_x$, $f_y$) are obtained when a sub-peak position other than the maximum peak located at the origin of coordinates, i.e., the position of C($\eta-f_x$, $\zeta-f_y$), is determined. As a consequence, $\theta_x$ and $\theta_y$, which are the respective inclinations (postures) of the object surface in X and Y directions, can be determined.

$\theta_x$ and $\theta_y$, which are the respective inclinations (postures) of the object surface in X and Y directions, can also be determined by the following technique (second technique) in place of the above-mentioned technique (first technique).

The outline of this inclination detection method is represented by individual steps (S21 to S27) in the flowchart of FIG. 9 in place of the steps 11 to 14 (S11 to S14) in FIG. 5.

First, interference fringe images carrying form information of the object to be observed, on which spatial carrier fringes are superposed, are captured by a CCD camera (S21). Subsequently, thus obtained interference fringe image data is subjected to a Fourier transform method (S22), and C($n-f_x$, $\zeta-f_y$), which is a spectrum distribution (side lobe) of carrier frequencies is extracted therefrom by filtering (S23). Then, this distribution C($n-f_x$, $\zeta-f_y$) is subjected to inverse Fourier transform, so as to yield c(x, y), whereby a wrapped phase is obtained (S24). Thereafter, upon unwrapping, a phase p(x, y) of the object is determined according to the form information of the object (S25). Subsequently, the method of least squares is used for determining the least-square plane of the phase p(x, y) (S26). Finally, the inclination of the object is determined according to differential coefficients of the least-square plane (S27).

In the Fourier fringe analyzing method in the first technique, after C($n-f_x$, $\zeta-f_y$), which is a spectrum distribution (side lobe) of carrier frequencies on a frequency coordinate system, is extracted by filtering, for example, a peak thereof is moved from its position ($f_x$, $f_y$) to the origin of coordinates so as to eliminate the carrier frequencies, and then an inverse Fourier transform method is carried out so as to determine the phase (form) of the object.

In the second technique, by contrast, the inclination of the object is assumed to be a part of form thereof and, without moving peaks of C($n-f_x$, $\zeta-f_y$), which is a spectrum distribution (side lobe) of carrier frequencies in the above-mentioned expression (30), i.e., without eliminating the carrier frequencies, the spectrum distribution C($n-f_x$, $\zeta-f_y$) is subjected to inverse Fourier transform. As a consequence, the finally obtained phase p(x, y) of the object includes an inclination component.

Namely, the p(x, y) is represented by the following expression (31):

$$p(x, y) = 2\pi f_x x + 2\pi f_y y + \phi(x, y) \quad (31)$$
$$= ax + by + \phi(x, y)$$
$$= \tan(\theta_x)x + \tan(\theta_y)y + \phi(x, y)$$

where
a is the differential coefficient of the least-square plane in the x direction; and
b is the differential coefficient of the least-square plane in the y direction.

Therefore, according to the second technique, the method of least squares is used for determining the least-square plane of the form of the object determined without eliminating carrier frequencies (the plane obtained by fitting the form with the method of least squares), the respective differential coefficients of the least-square plane in the x and y directions are determined, and the above-mentioned expression (31) is used for determining inclinations $q_x$ and $q_y$ of the object, whereby the inclination of the object can be determined easily.

When determining a plane indicative of the form of the object in the above-mentioned technique, a desirable plane to which a curved surface is fitted can also be obtained when other fitting techniques are employed in place of the method of least squares.

Thus, the posture (inclination) of the object to be observed can be detected when the Fourier transform fringe analyzing method is used. When determining the posture (inclination) of the object by using the Fourier transform fringe analyzing method, it is not necessary to use the whole region of fringe image, whereas sufficiently effective data can be obtained even when a part of the fringe image region is analyzed.

A method of correcting thus detected amount of inclination will now be explained.

First, the principle of correction will be explained with reference to a general expression of the phase shift method.

In an n-bucket phase shift system which moves the reference surface by using a PZT, the intensity distribution of interference fringes on the object to be observed in which the reference surface is shifted for j times (j=1, 2, . . . , n) is represented by the following expression (32):

$$i(x,y)=a(x,y)+b(x,y)\cos[2\pi f_x x+2\pi f_y y+\phi(x,y)+\xi_j] \quad (32)$$

In general, the j-th phase shift amount $\xi_j$(j=1, 2, . . . , n) is represented by the following expression (33) in a highly accurate actuator such as PZT:

$$\xi_j = \frac{2\pi(j-1)}{n} \quad (33)$$

where $\xi_j$ is the j-th phase shift amount (j=1, 2, ..., n).

The above-mentioned expression (33) may be expanded, whereby the sample phase $\phi(x, y)$ can be determined by utilizing the orthogonality of trigonometric functions. Thus determined expression (34) is as follows:

$$\phi(x, y) = \arctan\left(\frac{\sum s_j i_j}{\sum c_j i_j}\right) + const \quad (34)$$

where
$s_j$ is a constant; and
$c_j$ is a constant.

When the posture of the object relative to the reference surface is changed, the j-th (j=1, 2, ..., n) phase $\xi_j$ (whose specific value is unknown) is represented by the following expression (35):

$$\xi_j = (j-1) \cdot a + x\theta_{xj} + y\theta_{yj} \quad (35)$$
$$= (j-1) \cdot a + \varepsilon_j, \quad (j = 1, 2, ..., n)$$

where $\theta_{xj}$ and $\theta_{yj}$ are the inclinations of the actuator ($\varepsilon_j \ll \pi/2$).

Since $\theta_{xj}$ and $\theta_{yj}$ can be determined by the above-mentioned method, the phase analysis error can be corrected with a high accuracy by using the following expressions (36) and (37):

$$\sin(a+x) = \sin a + \cos a \cdot x - \frac{\sin a}{2!} \cdot x^2 - \frac{\cos a}{3!} \cdot x^3 + \frac{\sin a}{4!} \cdot x^4 + ... \quad (36)$$

$$\cos(a+x) = \cos a - \sin a \cdot x - \frac{\cos a}{2!} \cdot x^2 + \frac{\sin a}{3!} \cdot x^3 + \frac{\cos a}{4!} \cdot x^4 + ... \quad (37)$$

In the following, a 5-bucket method, which is often used, will be explained by way of example. The 5-bucket method is represented by the following expression (38):

$$\phi(x, y) = \arctan\left[\frac{2(i_1 - i_3)}{2i_2 - (i_0 + i_4)}\right] \quad (38)$$

When $a_j = \pi(j-1)/2$ (j=1, 2, ..., 5) is utilized here, the following expression (39) is obtained:

$$\frac{2(i_1 - i_3)}{2i_2 - (i_0 + i_4)} = \frac{2[\cos\phi \cdot (\cos\xi_1 - \cos\xi_3) - \sin\phi \cdot (\sin\xi_1 - \sin\xi_3)]}{\cos\phi \cdot (2\cos\xi_2 - \cos\xi_0 - \cos\xi_4) - \sin\phi \cdot (2\sin\xi_2 - \sin\xi_0 - \sin\xi_4)} \quad (39)$$

$$= \tan\phi + \frac{2\left[\cos\phi \cdot (\varepsilon_1 - \varepsilon_3) + \sin\phi \cdot \left(\frac{\varepsilon_1^2}{2} - \frac{\varepsilon_3^2}{2}\right)\right]}{\cos\phi \cdot \left[(2\varepsilon_2 - \varepsilon_0 - \varepsilon_4) + \sin\phi \cdot \left(\varepsilon_2^2 - \frac{\varepsilon_0^2}{2} - \frac{\varepsilon_4^2}{2}\right)\right]}$$

Since $\varepsilon_j^2$ is small in general, expression (39) is represented by the following expression (40):

$$\frac{2(i_1 - i_3)}{2i_2 - (i_0 + i_4)} = \tan\phi + \frac{2(\varepsilon_1 - \varepsilon_3)}{2\varepsilon_2 - \varepsilon_0 - \varepsilon_4} \quad (40)$$

Therefore, the following expression (41) is obtained:

$$\phi(x, y) = \arctan\left[\frac{2(i_1 - i_3)}{2i_2 - (i_0 + i_4)} - \frac{2(\varepsilon_1 - \varepsilon_3)}{2\varepsilon_2 - \varepsilon_0 - \varepsilon_4}\right] \quad (41)$$

Hence, the phase having corrected the shift error of the actuator can be determined.

Figure 7:
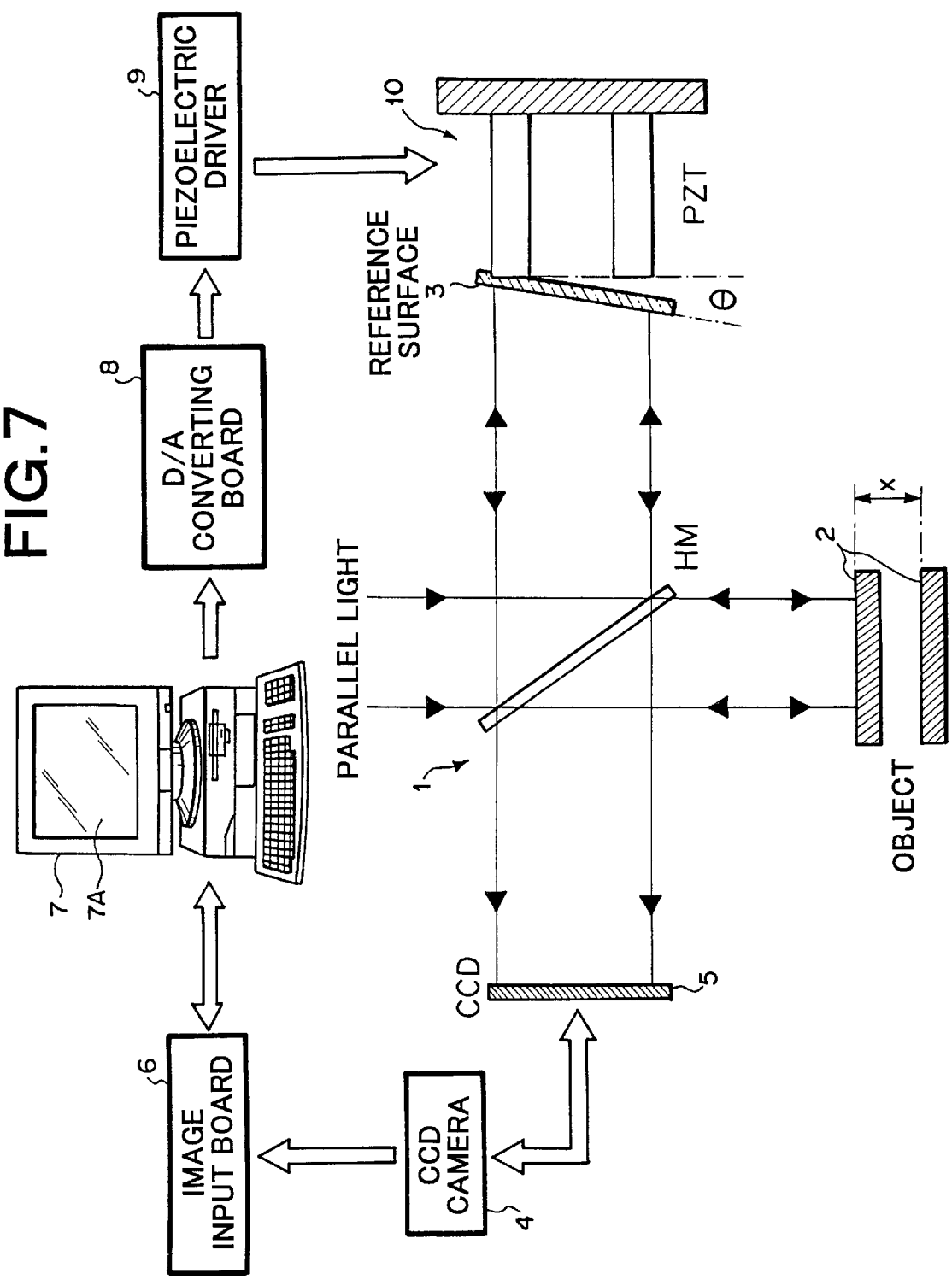
FIG. 7 is a block diagram for carrying out the method shown in FIG. 5.

An apparatus for carrying out the above-mentioned embodiment of the present invention will now be explained with reference to FIGS. 7 and 8.

This apparatus is used for carrying out the method in accordance with the above-mentioned embodiment. (As for the inclination detection, the first technique is illustrated.) As shown in FIG. 7, in a Michelson type interferometer 1, interference fringes formed by respective reflected luminous fluxes from an object surface 2 to be observed and a reference surface 3 are captured at an imaging surface of a CCD 5 of an imaging camera 4, and are fed into a computer 7 equipped with a CPU and an image processing memory by way of an image input board 6. Thus fed interference fringe image data is subjected to various arithmetic operations, and the results of operations are displayed on a monitor screen 7A. Here, the interference fringe image data output from the imaging camera 4 is temporarily stored into the memory upon an operation of the CPU.

As shown in FIG. 8, the computer 7 comprises, in terms of software, an FFT-operated complex amplitude calculating means 21, an inclination amount detecting means 22, and an inclination amount correcting means 23. The FFT-operated complex amplitude calculating means 21 carries out the operation of step 13 (S13) for subjecting the obtained interference fringe image to a Fourier transform method and extracting the FFT-operated complex amplitude as mentioned above. The inclination amount detecting means 22 carries out the operation corresponding to the above-mentioned step 14 (S14) according to the FFT-operated complex amplitude calculated in the FFT-operated complex amplitude arithmetic means 21. The inclination amount correcting means 23 carries out the operations corresponding to steps 15 and 16 (S15 and S16) in which, according to the amount of inclination of the reference surface detected by the inclination amount detecting means 22, the amount of inclination is compensated for, and the phase of the object is determined.

Both of the two methods (the method of detecting and correcting the amount of displacement of the phase shift element, and the method of detecting and correcting the amount of inclination) in accordance with the above-mentioned embodiments may be carried out in a single inspection step or correction step. In this case, the accuracy in analyzing fringe images can be raised more efficiently.

In general, it is necessary for a phase shift interferometer to control the determined phase shift amount (e.g., 45 degrees, 90 degrees, and 120 degrees) precisely, whereby an expensive actuator with a high accuracy is used therein. In the methods of the present invention, a carrier frequency is determined from the measured fringe image, and the amount of translational displacement of the phase shift and the amount of inclination of the reference surface and/or object based on the phase shift are determined according to the carrier frequency, whereby the displacement and inclination of the actuator can be detected. Also, a correction for compensating for the amount of displacement or amount of inclination is possible in the analysis of fringe image. Therefore, an expensive actuator having a high accuracy is not always necessary in accordance with the present invention. Also, when employing an N-bucket method, it is not always necessary to accurately adjust 1 step (360/N (degrees)).

In the following, the case where the methods of the present invention are applied to an arbitrary bucket phase shift interferometer will be explained. The arbitrary bucket phase shift interferometer is a phase shift interferometer in which the amount of phase shift can take any values (individual shift amounts may differ from each other) without being restricted to specific values (e.g., 45 degrees, 90 degrees, 120 degrees, and so forth). Though only 3-, 4-, and 5-bucket methods will be mentioned in the following explanation for convenience of explanation, the number of buckets is not limited to them as a matter of course.

First, in the arbitrary shift amount 4-bucket phase shift method, the interference fringe intensity at the m-th introduction of carrier frequencies is represented by the following expression (42):

$$i_{m(x,y,\xi_m)} = a(x, y) + b(x, y)\cos[2\pi f_{xm}x + 2\pi f_{ym}y + \phi(x, y) + \xi_m] \quad (42)$$
$$= a(x, y) + b(x, y)\cos[\phi(x, y) + \delta_m]$$

where
a(x, y) is the background of interference fringes;
b(x, y) is the visibility of fringes;
φ(x, y) is the phase of the object to be observed;
$\xi_m$ the phase shift amount of the phase shift element; and
$f_{xm}$ and $f_{ym}$ are carrier frequencies after the m-th phase shift:

$$\xi_m = 2\pi \frac{x_m}{\lambda}, \quad f_{xm} = \frac{2 \cdot \tan\theta_{xm}}{\lambda}, \quad f_{ym} = \frac{2 \cdot \tan\theta_{ym}}{\lambda} \quad (42a)$$
$$\delta_m = 2\pi f_{xm}x + 2\pi f_{ym}y + \xi_m$$

where λ is the wavelength of light, $\theta_{xm}$ and $\theta_{ym}$ are the respective inclinations (amounts of inclination) of the object in x and y directions after the m-th phase shift, and $x_m$ is the m-th phase shift amount.

Subsequently, in order to determine the object phase θ(x, y), the following expression (43) is considered:

$$p = \frac{i_3 - i_2}{i_2 - i_1} = \frac{\cos[\phi(x, y) + \delta_3] - \cos[\phi(x, y) + \delta_2]}{\cos[\phi(x, y) + \delta_2] - \cos[\phi(x, y) + \delta_1]} \quad (43)$$

Hence, the following expression (44) is obtained:

$$\phi(x, y) = \arctan\frac{\cos\delta_3 - (1 + p)\cos\delta_2 + p\cos\delta_1}{\sin\delta_3 - (1 + p)\sin\delta_2 + p\sin\delta_1} \quad (44)$$

Since the amount of phase shift displacement and amount of inclination of the reference surface or object generated upon driving the phase shift element PZT can be detected, $\delta_m$ in expression (42a) can be determined. Therefore, the wrapped phase φ of the object form can be determined by using the above-mentioned expression (44). Furthermore, the continuous object phase Φ can be determined by using a known unwrapping method.

In the arbitrary shift amount 4-bucket phase shift method, the following expressions (45) and (46):

$$p = \frac{i_4 - i_2}{i_3 - i_1} = \frac{\cos[\phi(x, y) + \delta_4] - \cos[\phi(x, y) + \delta_2]}{\cos[\phi(x, y) + \delta_3] - \cos[\phi(x, y) + \delta_1]} \quad (45)$$

$$\phi(x, y) = \arctan\frac{\cos\delta_4 - \cos\delta_2 + p\cos\delta_3 - p\cos\delta_1}{\sin\delta_4 - \sin\delta_2 + p\sin\delta_3 - p\sin\delta_1} \quad (46)$$

are used in place of the above-mentioned expressions (43) and (44).

In the arbitrary shift amount 5-bucket phase shift method, the following expressions (47) and (48):

$$p = \frac{2(i_4 - i_2)}{i_1 - 2i_3 + i_5} = \quad (47)$$
$$\frac{2\{\cos[\phi(x, y) + \delta_4] - \cos[\phi(x, y) + \delta_2]\}}{\cos[\phi(x, y) + \delta_1] - 2\cos[\phi(x, y) + \delta_3] + \cos[\phi(x, y) + \delta_5]}$$

$$\phi(x, y) = \arctan\frac{2\cos\delta_4 - 2\cos\delta_2 + p\cos\delta_1 - 2p\cos\delta_3 + p\cos\delta_5}{2\sin\delta_4 - 2\sin\delta_2 + p\sin\delta_1 - 2p\sin\delta_3 + p\sin\delta_5} \quad (48)$$

are used in place of the above-mentioned expressions (43) and (44).

Without being restricted to the above-mentioned embodiments, the methods of the present invention can be modified in various manners. For example, the phase shift element is not limited to the above-mentioned PZT, but may be those which can achieve the phase shift method by physically moving the reference surface or object surface or changing the optical path length by use of an AO element or EO element, or a transmission type element which can change the refractive index or the like so as to alter the optical path length when inserted into the reference optical path and/or observation optical path.

Though three PZT elements are exactly positioned at the respective vertices of a rectangular triangle as a mode for arranging them in the above-mentioned embodiments, the aimed effect can be obtained if the three members are arranged so as to form the respective vertices of a given triangle on the reference mirror.

Though the above-mentioned embodiments are explained while using spatial carrier frequencies as carrier frequencies, temporal carrier frequencies or temporal spatial carrier frequencies can also be used as the carrier frequencies of the present invention.

Though the interference fringe image data is captured with a Michelson type interferometer in the above-mentioned embodiment, the present invention is similarly applicable to interference fringe image data obtained by other types of interferometers such as those of Fizeau type as a matter of course.

Further, the present invention is similarly applicable to various kinds of fringe images such as moiré fringes and speckle fringes in addition to interference fringes.

Though the above-mentioned embodiments explain the case where fringe image data carrying surface form information of the object to be observed is utilized, the methods of the present invention are applicable to fringe image data carrying wavefront information of the object in general. For example, the methods of the present invention are also employable in the case where fringe image data carrying transmitted wavefront information of the object is utilized.

In the phase shift element error detection method of the present invention, when subjecting the fringe image data obtained by use of a phase shift method to a Fourier transform method, a carrier frequency and a complex amplitude which occur due to the deviation between the wavefront from the object and the wavefront from the reference are determined, and the amount of relative inclination between the object surface and the reference surface and the amount of displacement of the phase shift are detected according to the carrier frequency and the complex amplitude, whereby influences caused by errors in the amount of inclination and/or amount of displacement of the phase shift element can be detected favorably without complicating the apparatus configuration.

Since the phase shift element error correction method of the present invention carries out a correcting calculation for compensating for the amount of error detected upon analyzing the fringe image of the fringe image data, the influences of errors in the amount of inclination and/or amount of displacement can be corrected favorably without complicating the apparatus configuration with respect to the results obtained by using the phase shift method.

What is claimed is:

1. A fringe analysis error detection method in which phase shift elements are used for relatively phase-shifting an object to be observed and a reference with respect to each other, and a wavefront of said object is determined by a fringe analysis;

said method comprising the steps of Fourier-transforming two pieces of carrier fringe image data respectively carrying wavefront information items of said object before and after said phase shift; and carrying out a calculation according to a result of said transform so as to detect an amount of error of said phase shift.

2. A fringe analysis error detection method according to claim 1, wherein said fringe image data is carrier fringe image data on which carrier fringes are superposed.

3. A fringe analysis error detection method according to claim 2, wherein said two pieces of carrier fringe image data are Fourier-transformed so as to determine carrier frequencies, and a position of a spectrum is calculated according to two of said carrier frequencies so as to detect an amount of relative inclination between said object and reference generated by said phase shift.

4. A fringe analysis error detection method according to claim 3, wherein, when determining frequencies of said carrier fringes, a positional coordinate of a predetermined peak among peaks on a frequency coordinate system obtained by said Fourier transform is determined, and an arithmetic operation for calculating said carrier frequencies is carried out according to said positional coordinate.

5. A fringe analysis error detection method according to claim 2, wherein said two pieces of carrier fringe image data are Fourier-transformed so as to determine phase information of said object, and thus obtained phase information of said object is subjected to a predetermined arithmetic operation so as to detect an inclination of said object.

6. A fringe analysis error detection method according to claim 5, wherein, when determining said phase information of said object, a predetermined spectrum distribution among spectrum distributions on a frequency coordinate system obtained by said Fourier transform is determined, and an arithmetic operation for calculating said phase information according to said spectrum distribution is carried out.

7. A fringe analysis error detection method according to claim 5, wherein said predetermined arithmetic operation is an arithmetic operation for determining a least square of said phase information of said object.

8. A fringe analysis error detection method according to claim 2, wherein said two pieces of carrier fringe image data are Fourier-transformed so as to determine complex amplitudes of carrier fringes, and a position is calculated according to two of said complex amplitudes so as to detect an amount of translational displacement of said phase shift.

9. A fringe analysis error detection method according to claim 2, wherein said two pieces of carrier fringe image data are Fourier-transformed so as to determine carrier frequencies and complex amplitudes, and a position is calculated according to two of said carrier frequencies and two of said complex amplitudes so as to detect an amount of relative inclination between said object and reference and an amount of tilt displacement of said phase shift which are generated by said phase shift.

10. A fringe analysis error detection method according to claim 1, wherein said fringe images are interference fringe images.

11. A fringe analysis error correction method in which, after said detection is carried out in said fringe analysis error detection method according to claim 1, a correction calculation for compensating for the difference of the detected amount of inclination generated by said phase shift from a target amount of translational inclination and/or the difference of a predetermined amount of displacement of phase shift from a target predetermined amount of displacement of phase shift is carried out in said fringe analysis of said fringe image data.

* * * * *